United States Patent [19]

Brun, Jr. et al.

[11] Patent Number: 5,653,934
[45] Date of Patent: Aug. 5, 1997

[54] MOLDED PART TAKE-OUT APPARATUS

[75] Inventors: Charles J. Brun, Jr., Xenia; Anthony F. Newport, New Carlisle, both of Ohio

[73] Assignee: Electra Form, Inc., Vandalia, Ohio

[21] Appl. No.: 435,701

[22] Filed: May 5, 1995

[51] Int. Cl.$^6$ ................................................ B29C 37/00
[52] U.S. Cl. .......................... 264/334; 425/534; 425/441; 425/443
[58] Field of Search ................................. 264/334, 538, 264/336; 425/537, 436 RM, 438, 533, 556, 441, 443, 534, 436 R

[56] References Cited

U.S. PATENT DOCUMENTS

| | | | |
|---|---|---|---|
| 4,105,391 | 8/1978 | Aoki | 425/526 |
| 4,197,073 | 4/1980 | Rees et al. | 425/163 |
| 4,209,290 | 6/1980 | Rees et al. | 425/547 |
| 4,344,749 | 8/1982 | Fritz et al. | 425/174.4 |
| 4,747,769 | 5/1988 | Nakamura et al. | 425/529 |
| 5,273,152 | 12/1993 | Brun | 198/468.3 |
| 5,443,360 | 8/1995 | Lamb et al. | 414/799 |
| 5,447,426 | 9/1995 | Gessner et al. | 425/436 R |
| 5,486,103 | 1/1996 | Meiring et al. | 425/541 |

*Primary Examiner*—Jill L. Heitbrink
*Attorney, Agent, or Firm*—Locke Reynolds

[57] ABSTRACT

A molding machine including a mold for molding articles of plastic in the molding machine and apparatus for removing the molded articles from the molding machine. The mold includes molding elements movable by the molding machine in a first dimension between a closed conformation where the molding elements define cavities in which the articles are molded and an open conformation where the molding elements are separated from each other by a distance sufficient to permit release of the molded articles in a space between the molding elements. A first molding element includes channels situated on opposite sides of the molded articles for receiving the article removing apparatus while the molding elements are in the closed conformation. A cam track is fixed to the first molding element and a cam coupled to article holders is engaged in the cam track to move the article holders elements from a position aligned with the channels toward engagement with the molded articles as the molding elements open. A boom is coupled to the second molding elements and a trolley is coupled for linear movement along the boom, the article engaging elements being coupled to the trolley for movement out of the molding machine when it is open and into the channels when the molding machine is closed.

21 Claims, 14 Drawing Sheets

MOLDED PART TAKE-OUT APPARATUS

BACKGROUND OF THE INVENTION

The present invention relates generally to take-out apparatus used in conjunction with a plastics molding machine for removing molded articles from the machine. The present invention particularly relates to removing a large number of articles such as preforms intended for use in the manufacture of plastic bottles from the injection molds using a removal apparatus which does not form a part of the mold in which the preform is initially made.

In the manufacture of plastic articles in injection molding machines, an enhanced production rate is often achieved by simultaneously molding in a single machine a large number of the articles. The rate of production can be measured by the number of articles manufactured by each cycle of the machine divided by the time for each cycle. A number of factors impact on the production rate such as the capacity of the molding machine to plasticize the amount of plastic resin to the appropriate fluid state to permit formation by injection of the number of articles intended during each cycle of the machine.

An important limiting factor is the time required to cool the articles once formed in the molding machine of the plasticized or molten resin. The resin forming the articles must cool from the injection temperature, which is typically several hundred degrees Celsius, down to a temperature at which the articles will remain stable in form as they are handled in subsequent processes, which is generally a temperature less than 100° C. Of course, the exact temperatures are a function of the particular resin employed and well understood by those experienced in the art of injection molding.

The cooling time is a function of the amount of resin employed in the articles and in the thickness of the articles. As the thickness of the articles increases, the thermal conductivity of the plastic, which is generally poor, inhibits the flow of heat from interior portions of the article thus extending this cooling time. It has been recognized that the articles need not be fully cooled while in the injection molding machine, particularly where the articles are going to immediately be subject to a reforming process such as blow molding, so long as the surfaces of the articles are cooled sufficiently from the molten state to a maximum handling temperature, i.e., the temperature at which no appreciable distortion of the molded article occurs as a result of the removal of the article from the injection mold. This time can be minimized by handling the articles so that they experience a balance of any forces which could possibly cause appreciable distortion. For preforms used in the blow molding of plastic bottles, this minimization of distortional forces can be accomplished by molding the preforms in a vertical orientation rather than a horizontal orientation thereby minimizing gravitationally induced deflection of the preform.

Many of the vertically orientated preform molding machines are merely part of integrated injection blow molding machines in which the preform is directly transferred from the injection mold to a blow mold often by way of an intermediate temperature modification station all existing in a single machine. In such machines the transfer of the preform to subsequent stages of the machine occurs with the aid of a portion of the mold, often referred to as a thread split, which carries the preform from station to station within the machine, never releasing the molded article until the blow molded article is completed. Examples of such machines are found in U.S. Pat. Nos. 4,105,391; 4,344,749; and 4,747,769.

Some of the vertically orientated preform molding machines are coupled to separate blow molding or other apparatus such that the injection molded preform is transferred from the injection mold to a subsequent processing machine using a transfer or removal apparatus which does not form a part of the mold in which the preform is initially made. Examples of such machines are found in U.S. Pat. Nos. 4,197,073 and 4,209,290. In such machines, the overall rate of production of the molding machine is diminished by the amount of time required for the removal apparatus to enter the machine once the mold has opened a distance sufficient to permit the entry of the cooling apparatus. The rate of production of such molding machine could be increased were the preform removal apparatus designed to enter the molding machine while the article is being molded and to exit the molding machine immediately upon release of the molded article from the article-forming mold portion of the machine.

SUMMARY OF THE INVENTION

In accordance with the present invention, a molding machine including a mold for molding articles of plastic is coupled to an article removing apparatus. The mold comprises at least two molding elements which are movable by the molding machine in a first dimension, preferably vertically, between a closed conformation or position wherein the articles are molded and a spaced or open conformation where the articles are released into a space existing between the molding elements when in the open conformation. At least one of the two molding elements includes channels formed in the face of the molding element, the channels being situated on opposite sides of the molded articles, the channels extending in a second dimension, generally horizontally, for receiving the article removing apparatus.

The article removing apparatus includes at least two article engaging elements and a first means for moving the article engaging elements in the second dimension to introduce the article engaging elements into the channels in the face of one of the molding elements when the molding elements are situated in the closed conformation. A second means is provided for moving the article engaging elements with a first of the molding elements as the molding elements move in the first dimension from the closed conformation toward the spaced or open conformation. Additionally, a third means is provided for moving the article engaging elements from a position spaced on opposite sides of the molded articles into engagement with the molded articles as the mold is moving from the closed conformation to the open or spaced conformation.

Once the articles have been engaged, the first moving means is employed to move the article engaging elements and molded articles in the second dimension out of the space between the molding elements. As the molding elements return to a closed position to allow for manufacture of another set of molded articles, the second and third moving means acting together cause the article engaging elements to separate from each other thereby releasing the previously molded articles and returning the article engaging elements to an initial position situated outside of, but adjacent to the closed mold.

In a preferred embodiment, the mold comprises a cavity plate having a plurality of rows of cavities in which are molded preforms used in the manufacture of blow molded plastic bottles. The rows of cavities in the cavity plate are separated by channels in the face of the cavity plate adapted to receive the article engaging elements of the article removing apparatus. A core plate carries a plurality of cores, each core aligned with a cavity in the cavity plate, the core plate being arranged to reciprocate vertically with respect to the cavity plate. An intermediate plate carries a set of thread splits which form a part of the mold in which the preforms are molded to define the finish portion of the preforms.

The article engaging elements comprise a plurality of pairs of elongated bars, each pair of bars having confronting surfaces containing a row of scallops. The elongated bars are coupled at a first end to a trolley and at a second end to a length track. The trolley rides on a rail or boom which is mounted to the intermediate plate carrying the thread splits as the rail travels vertically with the intermediate plate. Thus, the trolley provides for horizontal travel of the article engaging elements in and out of the mold while the rail coupled to the intermediate plates causes vertical movement of the article engaging elements with the vertical movement of the thread splits.

The article engaging elements are coupled to two cam followers which are engaged in upwardly projecting cams fixed to the cavity plate. The cams include cam tracks configured to cause the cam followers to move toward each other as the core plate and intermediate plate move vertically away from the cavity plate. This movement of the cams causes the scalloped portions of the article engaging bars to surround the preforms in close proximity such that upon release of the preforms by the thread splits, the preforms drop a short distance until contact occurs between a support ring on the preform and the article engaging bars. Once the articles are removed from the mold by outward movement of the trolley, the downward motion of the core and intermediate plate toward the cavity plate causes the cam followers to move outwardly thereby causing the article engaging bars to separate from each other releasing the preforms onto an appropriate receiver for further processing.

One feature of the present invention is the incorporation of slots or channels in a mold face adapted to receive the article engaging elements of the article removing apparatus. The presence of these slots or channels enables the article removing apparatus to enter the mold while the mold is in a closed position or conformation. This has the advantage of increasing the production rate by avoiding the need to wait until the mold is fully opened before the article removing apparatus can enter the space to engage the molded articles.

Another feature of the present invention is the use of a set of cams and cooperating cam followers coupled to the tracks of the article engaging elements. The cams and cam followers acting together determine the engagement of disengagement of the article engaging apparatus merely as a function of the vertical position of the mold elements. This has the advantage of simplifying the operational control of the apparatus thereby enhancing its reliability of operation.

Other features and advantages will become apparent to those skilled in the art upon consideration of the following description of a preferred embodiment exemplifying the best mode for implementing the invention known to the inventors at the time of application. The detailed description refers to the accompanying drawings.

BRIEF DESCRIPTION OF THE DRAWINGS

FIGS. 1–6 are side elevation views of an injection molding machine and transfer apparatus in accordance with the present invention in six different positions showing the sequence of operation of the apparatus, namely.

FIGS. 7–10 are end elevation views of the apparatus shown in FIGS. 1–6 in four different positions showing the sequence of operation of the apparatus, namely, FIG. 7 shows the apparatus in the position illustrated in FIG. 2;

FIG. 9 shows the apparatus in the position illustrated in FIG. 4; and

FIG. 10 shows the apparatus in the position illustrated in FIG. 5.

FIGS. 11–14 are sectional views of the apparatus shown in FIGS. 1–10 showing plan views of the transfer apparatus in four different positions showing the sequence of operation of the apparatus, namely.

DESCRIPTION OF A PREFERRED EMBODIMENT

Figure 1:
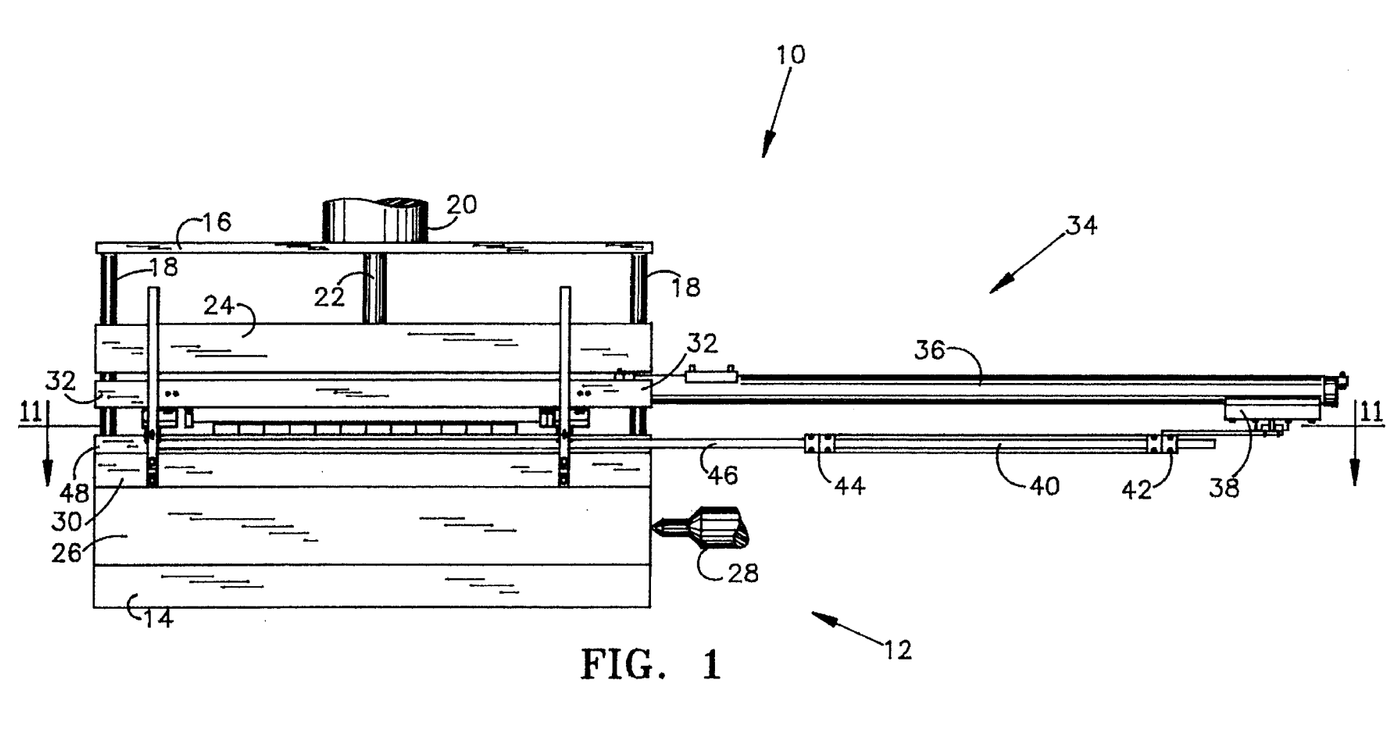
FIG. 1 shows the injection molding machine in a closed position and the transfer apparatus located outside the injection mold area.

An apparatus 10 in accordance with the present invention is shown in FIG. 1 to include a molding machine 12 including a base 14, a yoke 16 fixed to the base by tie bars 18 and a clamping cylinder 20 fixed to yoke 16. A piston rod 22 coupled to a piston (not shown) within clamping cylinder 20 is fixed to a movable platen or core plate 24 which is moved vertically relative to the base 14 by the clamping cylinder 20. The base 14 also supports a hot manifold 26 which distributes molten plastic from a plasticator injection unit 28 to a plurality of cavities in cavity plate 30. The movable platen or core plate 24 carries a plurality of cores, each core being aligned with one of the cavities in the cavity plate 30. An intermediate plate 32 situated between cavity plate 30 and core plate 24 carries a plurality of thread splits. In a known manner, the thread splits, together with the core and cavity, define a closed region into which the molten plastics from the plasticator injection unit 28 is forced in order to form preforms for use in the manufacture of blow molded plastic bottles. The thread splits generally define that portion of the mold which determines the configuration of the finish portion of the preforms which is adapted to receive a closure. The cavity portion of each mold typically defines the general exterior of the remainder of the preform. The core generally defines the interior of the preform.

Figure 11:
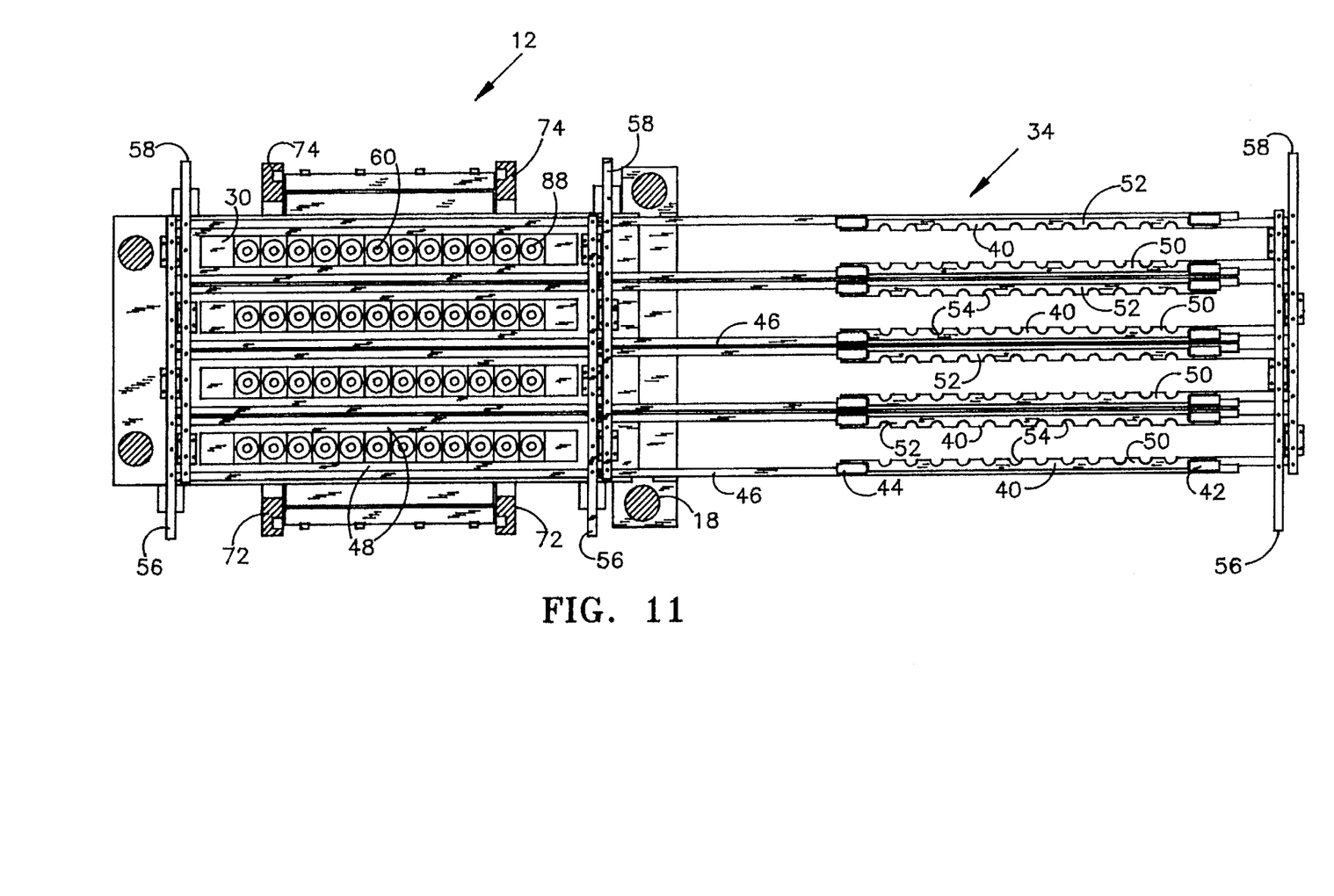
FIG. 11 shows the apparatus in the position illustrated in FIG. 1 sectioned along lines 11—11.

As shown by FIGS. 1 and 11 an article removing apparatus 34 which includes a rail or a boom 36 is fixed to the intermediate plate 32. Any vertical movement of the intermediate plate 32 relative to base 14 is reflected in the identical vertical movement of rail or boom 36. A trolley 38 is coupled to the rail or boom 36 for movement toward and away from the intermediate plate 32. The movement of the trolley can be achieved using a belt drive and motor, a pneumatic cylinder or other drive means conventionally used in connection with plastics molding.

A set of article engaging elements 40 have a first end 42 coupled to the trolley 38 and a second end 44 coupled to a length track 46. The track 46 is situated in linear channels 48 existing in the top surface of cavity plate 30. The article engaging elements 40 are in the form of confronting pairs of elongated bars 50 and 52 as shown in FIG. 11. The confronting surfaces of each pair of bars includes a plurality of scallops 54 sized to closely surround the exterior of the preforms being manufactured in the molding machine 10. All of the elongated bars 50 are tied together for simultaneous movement by a first set of tie bars 56 while the elongated bars 52 are all tied together by tie bars 58.

Figure 2:
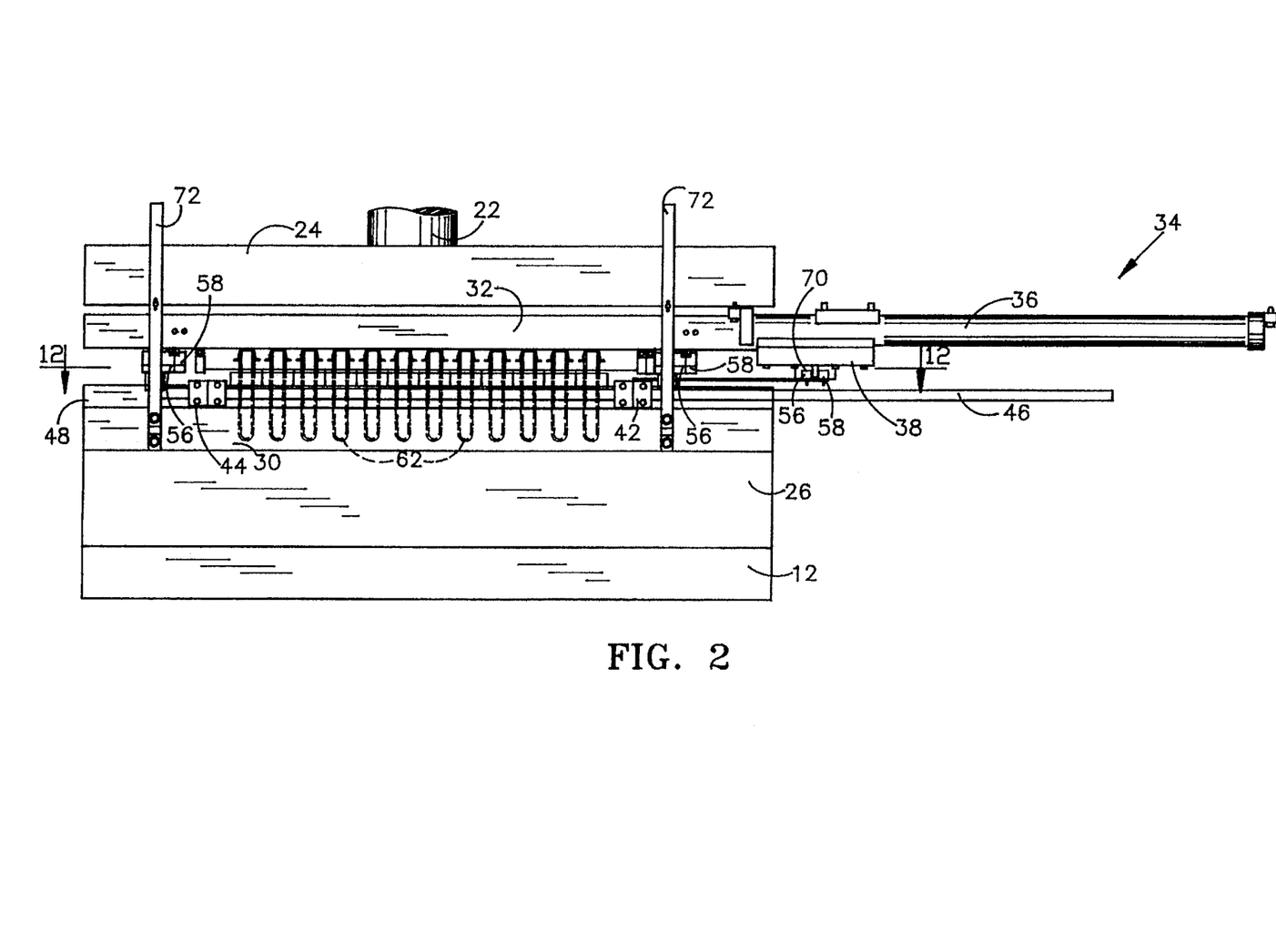
FIG. 2 shows the injection molding machine in the closed position and the transfer apparatus moved into the injection mold area.
Figure 7:
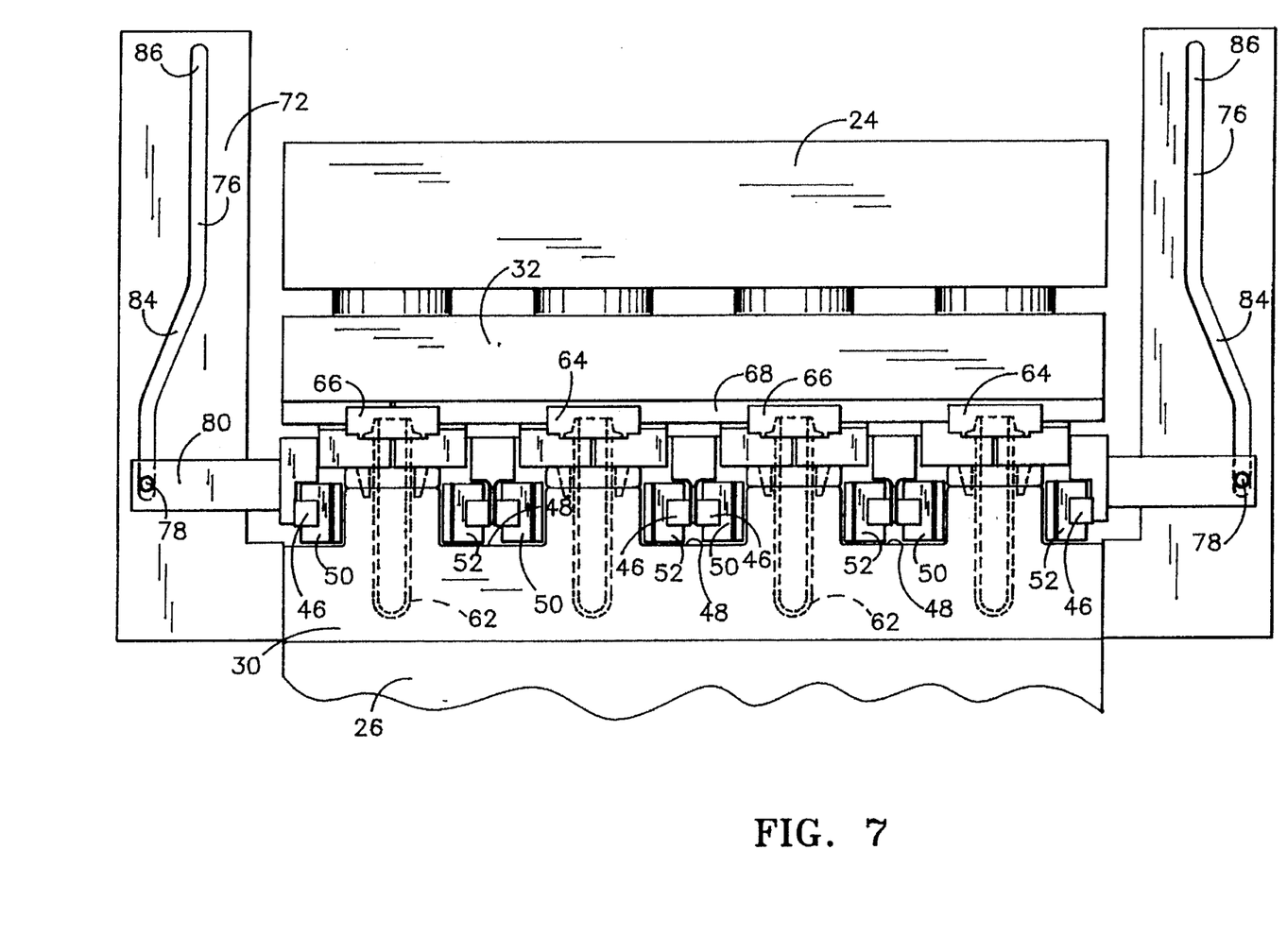
Figure 8:
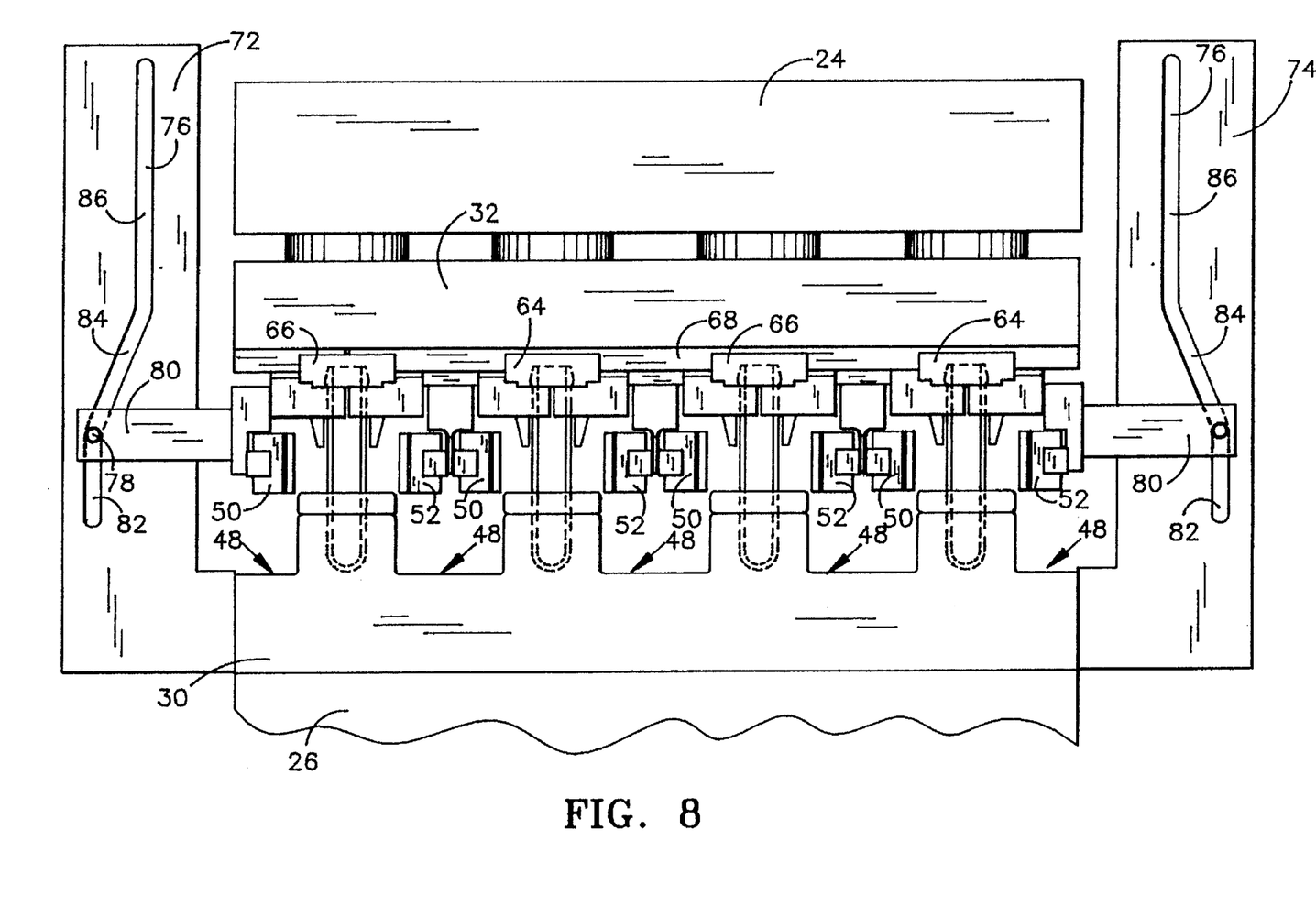
FIG. 8 shows the apparatus between the positions illustrated in FIGS. 2 and 3.
Figure 9:
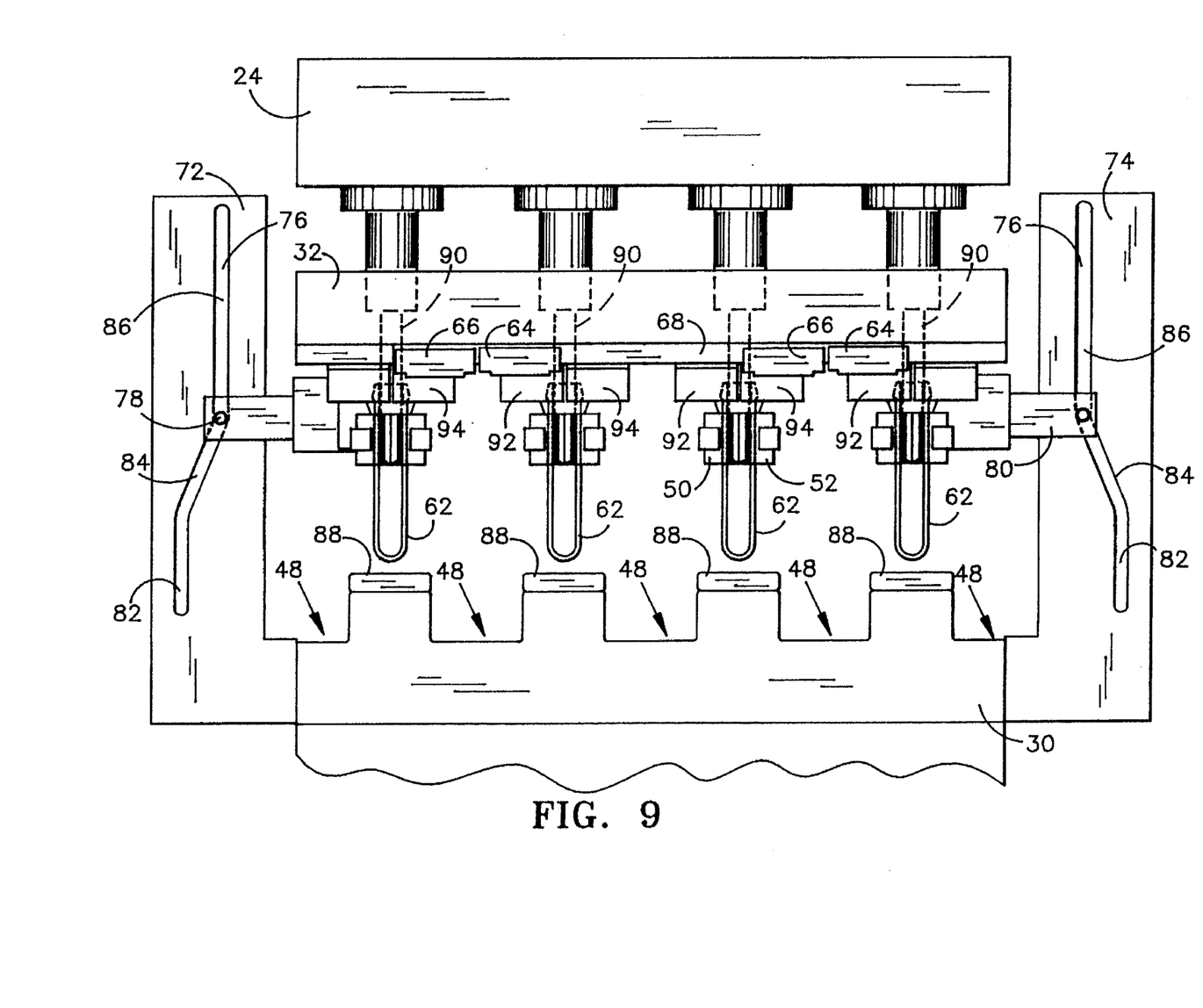
Figure 10:
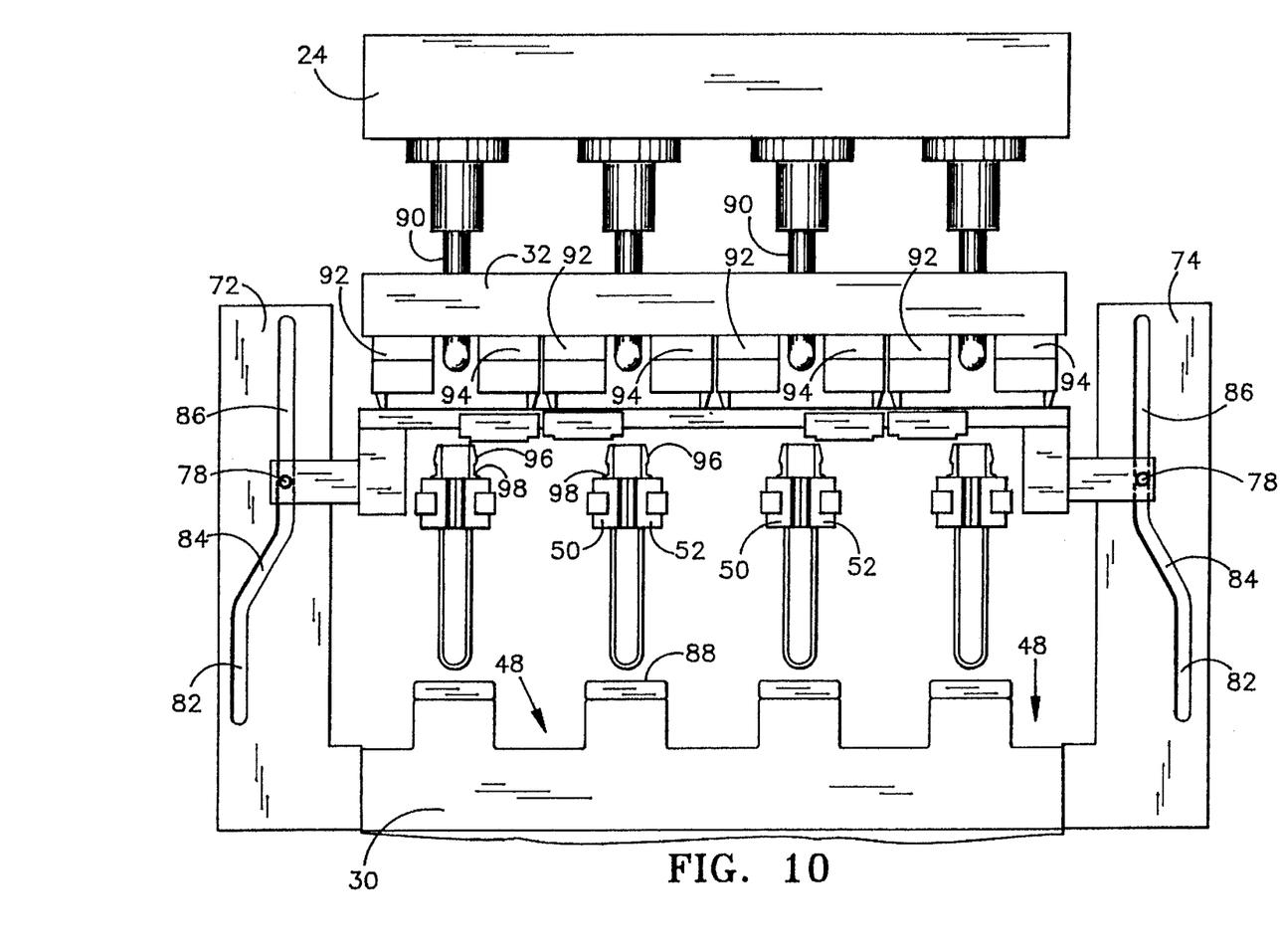
Figure 12:
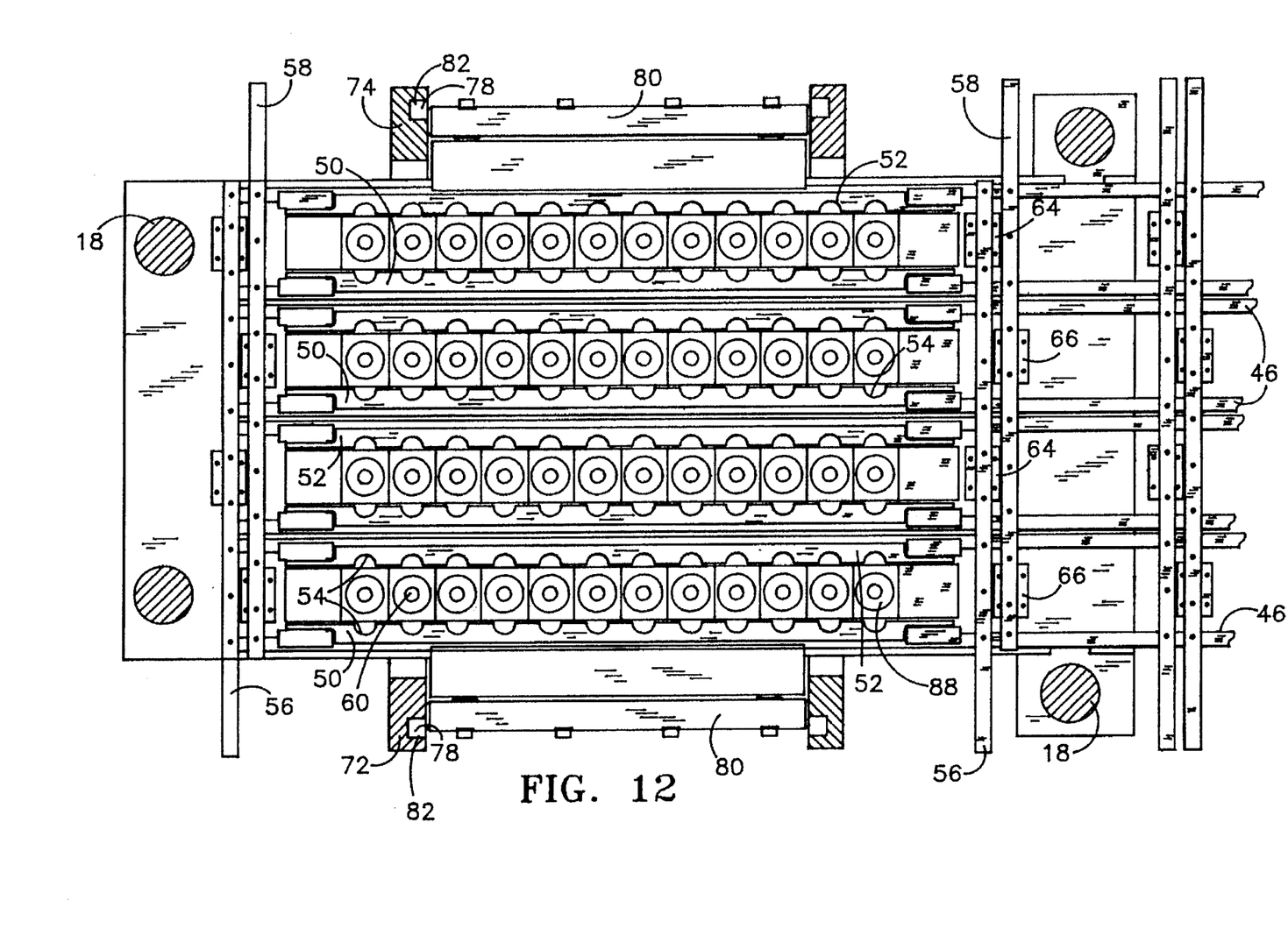
FIG. 12 shows the apparatus in the position illustrated in FIGS. 2 and 7 sectioned along lines 12—12 in FIG. 2.

As the trolley 38 moves from the position shown in FIGS. 1 and 11 to the position shown in FIG. 2, the article engaging elements 40 move along track 46 and into channels 48 of cavity plate 30 as shown in FIGS. 2, 7 and 12. The elongated bars 50 and 52 are positioned such that scallops 54 are aligned on opposite sides of the cavities 60 in which the preforms 62 shown in phantom in FIGS. 2 and 7 are being molded. The tie bars 56 are coupled to slide elements 64 while the tie bars 58 are coupled to slide elements 66. The slide elements 64 and 66 are mounted for movement along track 68 fixed to intermediate plate 32. An additional set of slide elements, not shown, are coupled to a track 70 fixed to the bosom of trolley 38 as shown in FIG. 2.

A first pair of cams 72 are fixed to a first side of cavity plate 30 while a second set of cams 74 are fixed to the opposite side of cavity plate 30. Each of the cams 72 and 74 includes a cam track 76. A cam follower 78 is engaged in each cam track. The cam followers 78 are fixed to beam 80 which is in turn fixed to track 46 carrying the outermost elongated bars 50 and 52.

Figure 3:
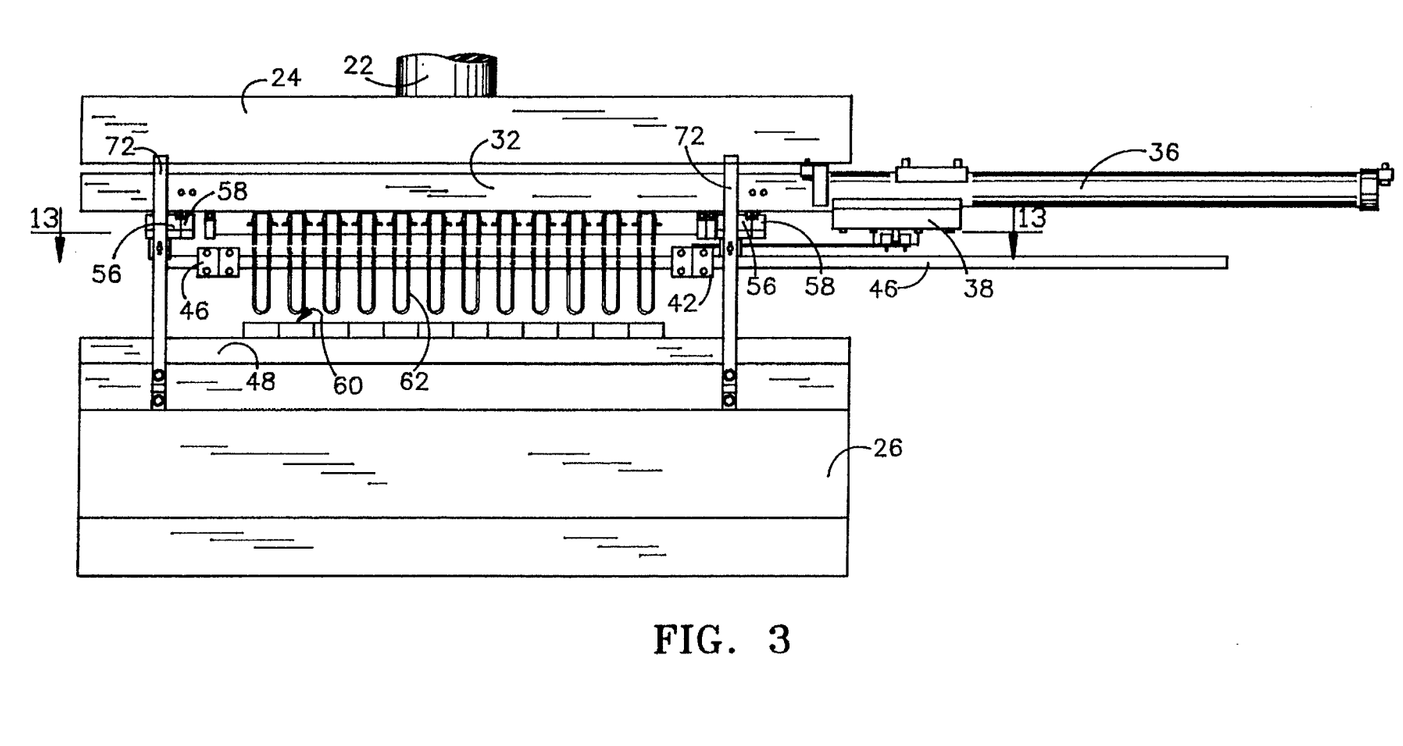
FIG. 3 shows the injection molding machine open to the point that the preforms are outside the mold cavities, the transfer apparatus having moved vertically with the thread splits.
Figure 4:
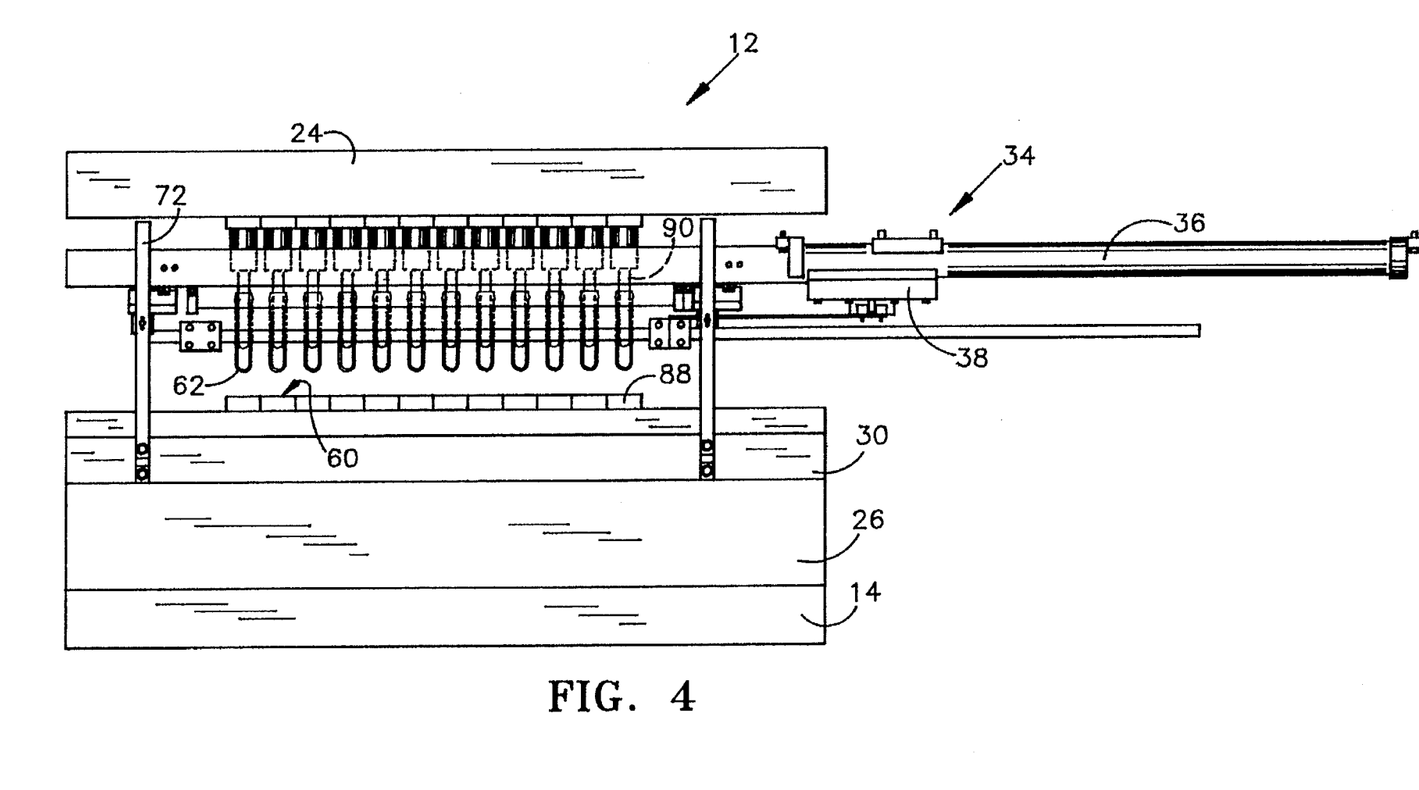
FIG. 4 shows the mold cores partially withdrawn from the preforms.
Figure 13:
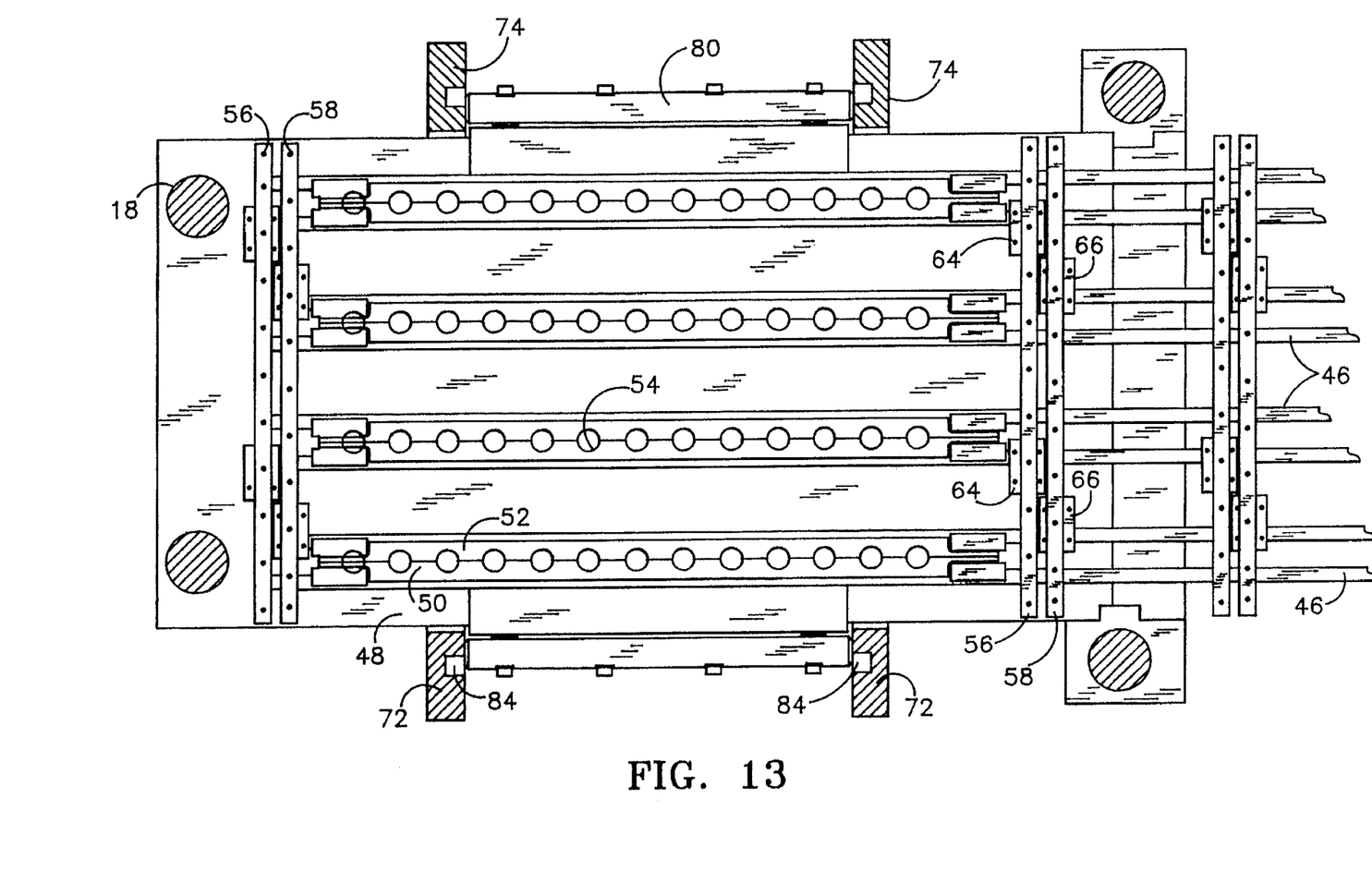
FIG. 13 shows the apparatus in the position illustrated in FIGS. 3–5 and 9 sectioned along lines 13—13 in FIG. 3.

The cam tracks 76 are divided into a lower linear portion 82, a middle inclined portion 84 and an upper linear portion 86 as shown in FIGS. 7-10. Upon completion of formation of the preforms 62 within the cavities 60, the clamping cylinder 20, as shown in FIG. 1, initiates upward motion of piston rod 22 as shown initially by the difference in position illustrated in FIGS. 7 and 8. This upward motion enables the elongated bars 50 and 52 to move vertically out of channels 48 until they clear the tops 88 of the cavities 60 in cavity plate 30. At this point, the cam followers 78 encounter the inclined portion 84 of cam track 76. A further upward movement results in the apparatus assuming the position shown in FIGS. 3, 9 and 13. The inclined portion 84 of the cam tracks 76 causes the cam followers 78 to push the beams 80 inward. This inward motion causes a displacement of slide elements 64 and 66 along track 68, shown in FIG. 9, which in turn causes the tie bars 56 and 58 to be displaced relative to each other. This displacement causes the elongated bars 50 and 52 to close on the preforms such that each preform is surrounded and captured by the confronting scallops 54 of bars 50 and 52.

Figure 5:
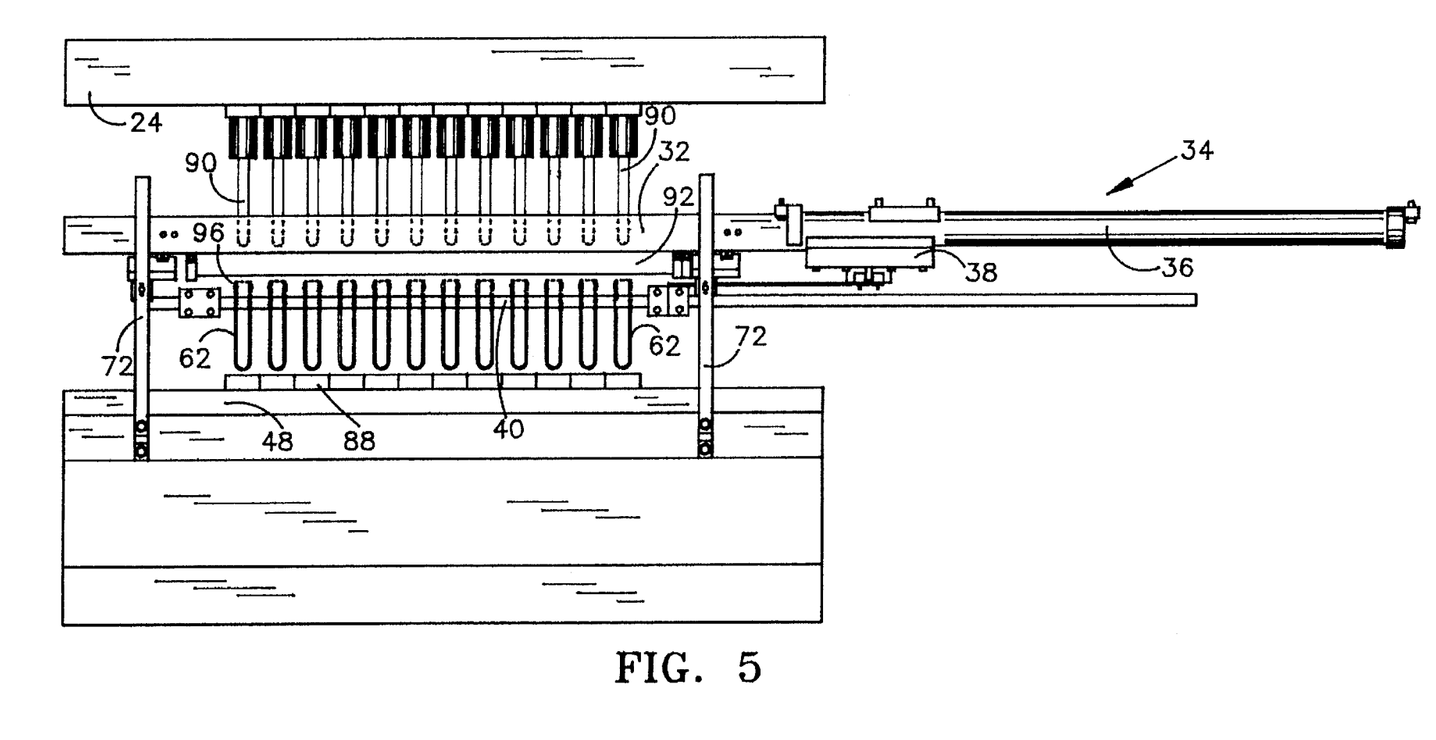
FIG. 5 shows the mold cores fully withdrawn from the preforms, the preforms having been dropped onto the transfer apparatus.
Figure 6:
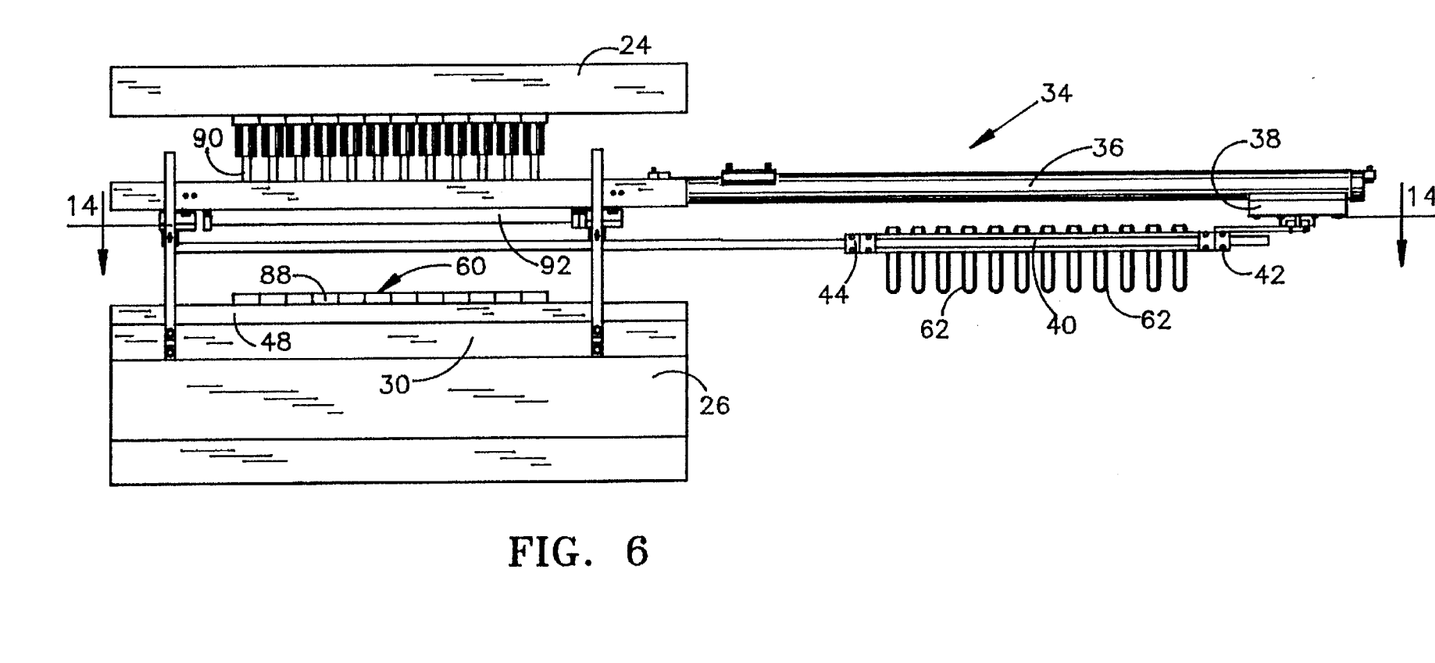
FIG. 6 shows the transfer apparatus and molded preforms removed from the mold area, and the mold ready to move to the position shown in FIG. 1.
Figure 14:
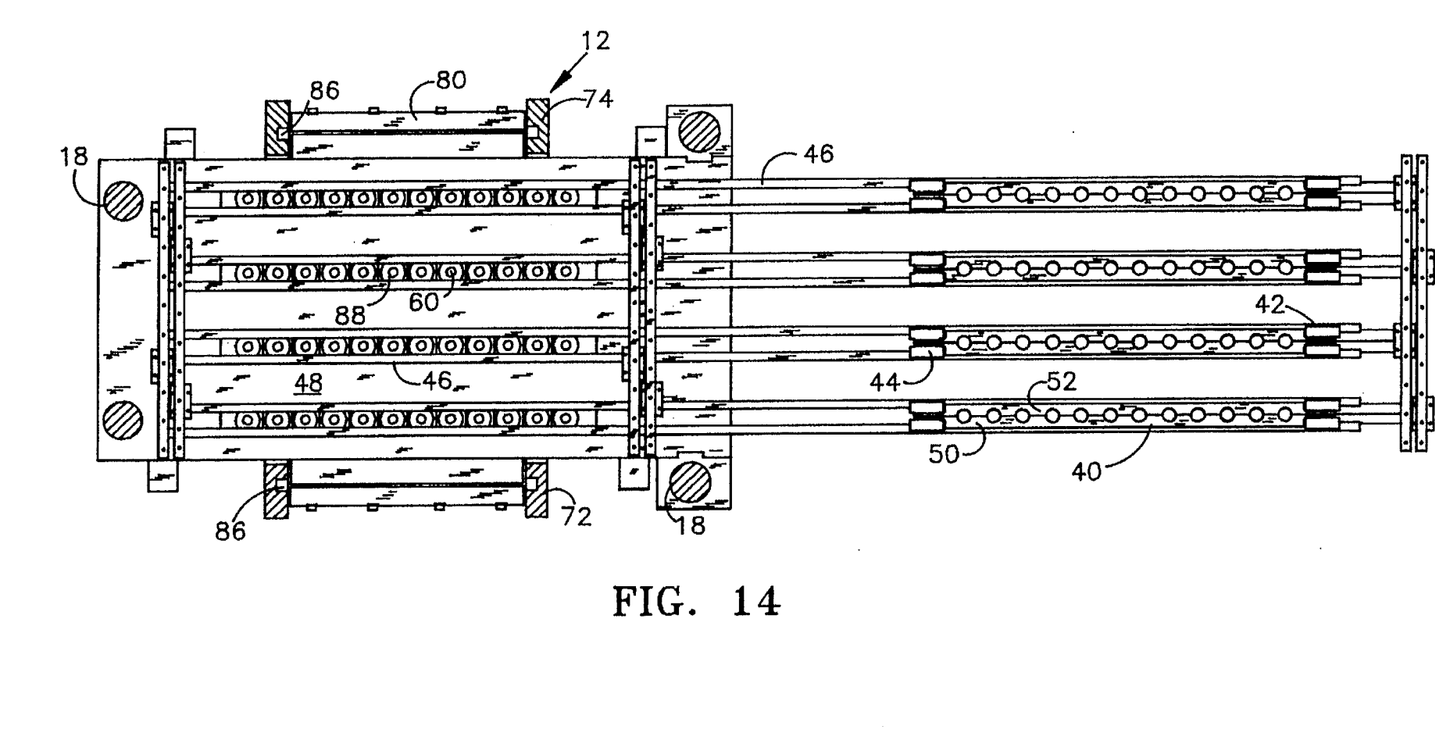
FIG. 14 shows the apparatus in the position illustrated in FIGS. 6 and 10, sectioned along lines 14—14 in FIG. 6.

This upward motion of the intermediate plate 32 also causes the bosoms of the preforms 62 to emerge from the tops 88 of the cavities 60 in cavity plate 30. At this point, the movable core plate 24 begins to be withdrawn away from the intermediate plate 32 causing the cores 90 coupled to the movable core plate 24 to initiate withdrawal from the interior of the preforms 62 in a known manner. As the movable core plate 24 and intermediate plate 32 continue the upward movement to the positions shown in FIGS. 5 and 10, the cores are completely withdrawn from the preform 62. Additionally, the thread splits 92 and 94 carried by the intermediate plate 32 separate from each other in a known manner as shown by the difference in position between FIGS. 9 and 10 thereby releasing the finish portion 96 of the preform 62. This causes the preforms to drop a short distance within the scallops 54 of bars 50 and 52 until the support flanges 98 of the preforms contact the top surface of the elongated carrier bars 50 and 52. At this point the preforms 62 are completely free from contact with any portion of the molding machine 12 and can be removed by the article removing apparatus 34 by a linear motion of trolley 38 along boom 36 to the position shown in FIGS. 6 and 14. The linear motion of the trolley 38 along the boom 36 can be controlled by limit switches detecting the vertical position of the core plate, as well as by coupling the removing apparatus 34 to the usual controller used for the molding machine 12.

Upon completion of the linear motion of the trolley 38 along boom 36, the movable core plate 24 and intermediate plate 32 begin a coordinated downward motion so that the molding apparatus 10 can reassume the position shown in FIG. 1. This downward motion causes the cam followers 78 to be driven downward along the length of the cam tracks 76 in both cams 72 and 74 thereby causing an outward displacement of the confronting surfaces of the elongated carrier bars 50 and 52 away from each other thus releasing the preforms 62 into a subsequent mechanism (not shown) for further treatment in accordance with the usual practices for the manufacture of containers or other articles from such preforms.

In accordance with the present invention, the injection molded preforms are transferred from the injection mold to a subsequent processing machine using a transfer or removal apparatus 34 which does not form a part of the mold in which the preform is initially made. That is, the transfer apparatus 34 uses structures other than the thread splits 92 and 94 or equivalent structures which define a portion of the surface configuration of the preforms. However the separate transfer apparatus 34 uses the channels 48 in the mold face to enhance the overall production rate by eliminating any amount of time which might be required by prior art machines for the removal apparatus to enter the molding machine once the mold has opened a distance sufficient to permit the entry of a transfer apparatus. In particular the rate of production of such molding machine is increased since the preform removal apparatus is designed to enter the molding machine while the article is being molded and to exit the molding machine immediately upon release of the molded article from the mold.

It will be appreciated by those skilled in the art that a coordinated vertical movement of the mold plates 24 and 32 and the trolley carrying boom 36 could be achieved by a separate drive and positioning apparatus but at considerable increase in complexity and corresponding decrease in reliability of performance. It will also be appreciated by those skilled in the art that a coordinated horizontal movement of the elongated bars 50 and 52 toward and away from each other to engage and release the molded preforms could be achieved by a separate drive and positioning apparatus but generally at considerable increase in complexity and corresponding decrease in reliability of performance.

Although the present invention has been described in connection with a preferred embodiment thereof, many variations and modifications may now become apparent to those skilled in the art.

What is claimed is:

1. A method for removing molded plastic articles from a mold of a molding machine, the mold comprising at least two molding elements movable in a first dimension between a closed conformation wherein the articles are molded and a spaced conformation wherein the articles are released in a space between the molding elements, the method comprising the steps of:

provide channels in at least one of the molding elements, the channels extending in a second dimension situated on opposite sides of the molded articles, moving article engaging elements into the channels when the molding elements are situated in said closed conformation, moving the article engaging elements with one of the molding elements as the molding element moves in the first dimension from the closed conformation toward the spaced conformation, moving the article engaging elements from a position spaced on opposite sides of the articles into engagement with the molded articles in said space as the molding elements arrive at the spaced conformation, and moving the article engaging elements and molded articles in the second dimension out from between the molding elements.

2. The method of claim 1 further comprising the steps of releasing the molded articles from the article engaging elements as the mold elements move from the spaced conformation to the closed conformation, and reintroducing the article engaging elements into the channels when the molding elements are situated in said closed conformation.

3. An improved mold for a plastic article molding machine having an article removing apparatus, wherein the improved mold comprises:

at least a first and second molding elements movable by the molding machine in a first dimension between a closed conformation where the first and second molding elements define at least one cavity in which the articles are molded and a spaced conformation where the first and second molding elements are separated from each other in the first dimension by a distance sufficient to permit release of the molded articles in a space between the first and second molding elements, the first molding element including at least two channels situated on opposite sides of the molded articles for receiving the article removing apparatus while the molding elements are in the closed conformation, the channels extending in a second dimension orthogonal to the first dimension.

4. The improved mold of claim 3 further comprising an additional, intermediate molding element situated between the first and second molding elements and defining a surface of at least a portion of the molded articles.

5. In combination with a molding machine including a mold for molding articles of plastic in the molding machine, the mold comprising at least two molding elements movable by the molding machine in a first dimension between a closed conformation wherein the articles are molded and a spaced conformation wherein the articles are released in a space between the molding elements, at least one of the at least two molding elements including channels situated on opposite sides of the molded articles and extending in a second dimension, an apparatus for removing the molded articles therefrom, the article removing apparatus comprising:

at least two article engaging elements, a first means for moving the article engaging elements in the second dimension to introduce the article engaging elements into the channels when the molding elements are situated in said closed conformation, a second means for moving the article engaging elements with a first of the molding elements as the molding elements move in the first dimension from the closed conformation toward the spaced conformation, and a third means for moving the article engaging elements from a position spaced on opposite sides of the articles into engagement with the molded articles in said space as the molding elements arrive at the spaced conformation.

6. The apparatus of claim 5 further comprising a first control coupled to the first means for moving the article engaging elements and molded articles in the second dimension out from between the molding elements when the molding elements are in said spaced conformation.

7. The apparatus of claim 6 further comprising means coupled to the third means for releasing the molded articles from the article engaging elements as the molding elements move from the spaced conformation to the closed conformation.

8. The apparatus of claim 5 wherein the at least two article engaging elements comprise a plurality of pairs of engaging elements, each pair of engaging elements having confronting surfaces configured to cooperatively engage the molded articles.

9. The apparatus of claim 8 wherein two article engaging elements of two different pairs are introduced in a single channel of the mold when the molding elements are in the closed conformation.

10. The apparatus of claim 5 wherein the second means comprises a boom coupled to said first of the molding elements, said boom supporting said article engaging elements.

11. The apparatus of claim 10 wherein the first means comprises a trolley coupled for linear movement along said boom, the article engaging elements being coupled to the trolley for movement therewith.

12. The apparatus of claim 5 wherein the third means comprises a cam track fixed to a second of said molding elements, and a cam coupled to said article engaging elements and engaged in the cam track, the cam track having a contour to move the article engaging elements from a position spaced on opposite sides of the articles into near engagement with the molded articles as the first and second molding elements move from the closed conformation to the spaced conformation.

13. The apparatus of claim 12 further comprising stripper withdrawal means for stripping withdrawal of the molded articles from engagement by the first molding element to engagement by the article engaging elements.

14. The apparatus of claim 13 wherein the stripper withdrawal means comprises an additional molding element defining a surface of at least a portion of the molded articles.

15. A molding machine comprising an article removing apparatus, a cam track, a cam, and a mold for molding articles of plastic in the molding machine, the mold including at least a first and second molding elements movable by the molding machine in a first dimension between a closed conformation where the first and second molding elements define at least one cavity in which the articles are molded and a spaced conformation where the first and second molding elements are separated from each other in the first dimension by a distance sufficient to permit release of the molded articles in a space between the first and second molding elements, the first molding element including at least two channels situated on opposite sides of the molded articles for receiving the article removing apparatus while the molding elements are in the closed conformation, the channels extending in a second dimension orthogonal to the first dimension, the cam track fixed to the first molding element, the article removing apparatus including at least a pair of article engaging elements, and the cam coupled to said article engaging elements and engaged in the cam track, the cam track having a contour to move the article engaging elements from a position spaced on opposite sides of the articles toward engagement with the molded articles as the first and second molding elements move from the closed conformation to the spaced conformation.

16. A molding machine comprising an article removing apparatus, a boom, a trolley, and a mold for molding articles of plastic in the molding machine, the mold including at least a first and second molding elements movable by the molding machine in a first dimension between a closed conformation where the first and second molding elements define at least one cavity in which the articles are molded and a spaced conformation where the first and second molding elements are separated from each other in the first dimension by a distance sufficient to permit release of the molded articles in a space between the first and second molding elements, the first molding element including at least two channels situated on opposite sides of the molded articles for receiving the article removing apparatus while the molding elements are in the closed conformation, the channels extending in a second dimension orthogonal to the first dimension, the boom coupled to the first of the molding elements, the trolley coupled for linear movement along said boom, the article removing apparatus including at least a pair of article engaging elements, the article engaging elements being coupled to the trolley for movement therewith.

17. A molding machine comprising an article removing apparatus and a mold for molding articles of plastic in the molding machine, the mold including at least a first and second molding elements movable by the molding machine in a first dimension between a closed conformation where the first and second molding elements define at least one cavity in which the articles are molded and a spaced conformation where the first and second molding elements are separated from each other in the first dimension by a distance sufficient to permit release of the molded articles in a space between the first and second molding elements, the first molding element including at least two channels situated on opposite sides of the molded articles for receiving the article removing apparatus while the molding elements are in the closed conformation, the channels extending in a second dimension orthogonal to the first dimension, the article removing apparatus including a plurality of pairs of article engaging elements, each pair of engaging elements having confronting surfaces configured to cooperatively engage the molded articles, two article engaging elements of two different pairs being introduced in a single channel of the mold when the molding elements are in the closed conformation.

18. A molding machine comprising an article removing apparatus and a mold for molding articles of plastic in the molding machine, the mold including at least a first and second molding elements movable by the molding machine in a first dimension between a closed conformation where the first and second molding elements define at least one cavity in which the articles are molded and a spaced conformation where the first and second molding elements are separated from each other in the first dimension by a distance sufficient to permit release of the molded articles in a space between the first and second molding elements, the first molding element including at least two channels situated on opposite sides of the molded articles for receiving the article removing apparatus while the molding elements are in the closed conformation, the channels extending in a second dimension orthogonal to the first dimension, the article removing apparatus including at least one pair of article engaging elements, means for moving in the second dimension the article engaging elements and molded articles out from between the molding elements when the molding elements are in said spaced conformation, and means for releasing the molded articles from the article engaging elements as the molding elements move from the spaced conformation to the closed conformation.

19. A molding machine comprising an article removing apparatus and a mold for molding articles of plastic in the molding machine, the mold including at least a first and second molding elements movable by the molding machine in a first dimension between a closed conformation where the first and second molding elements define at least one cavity in which the articles are molded and a spaced conformation where the first and second molding elements are separated from each other in the first dimension by a distance sufficient to permit release of the molded articles in a space between the first and second molding elements, the first molding element including at least two channels situated on opposite sides of the molded articles for receiving the article removing apparatus while the molding elements are in the closed conformation, the channels extending in a second dimension orthogonal to the first dimension, the article removing apparatus for removing the molded articles from the molding machine comprising at least two article engaging elements, and a first means for moving the article engaging elements in the second dimension to introduce the engaging elements into the channels when the molding elements are situated in said closed conformation.

20. The molding machine of claim 19 further comprising second means for moving the article engaging elements with the second molding element as the molding elements move in the first dimension from the closed conformation toward the spaced conformation.

21. The molding machine of claim 20 further comprising third means for moving the article engaging elements from a position spaced on opposite sides of the articles toward engagement with the molded articles in said space as the molding elements arrive at the spaced conformation.

* * * * *